A. P. HAASE & F. D. PEARNE.
SYSTEM OF RECTIFICATION.
APPLICATION FILED AUG. 5, 1915.

1,237,638.

Patented Aug. 21, 1917.
3 SHEETS—SHEET 1.

Inventors:
Arthur P. Haase
Frank D. Pearne
By Gillson-Gillson Attys.

A. P. HAASE & F. D. PEARNE.
SYSTEM OF RECTIFICATION.
APPLICATION FILED AUG. 5, 1915.

1,237,638.

Patented Aug. 21, 1917.
3 SHEETS—SHEET 2.

Inventors:
Arthur P. Haase
Frank D. Pearne
By Gillson & Gillson
Att'ys.

UNITED STATES PATENT OFFICE.

ARTHUR P. HAASE AND FRANK D. PEARNE, OF CHICAGO, ILLINOIS, ASSIGNORS TO WILLIAM STAHL, OF EVANSTON, ILLINOIS.

SYSTEM OF RECTIFICATION.

1,237,638.     Specification of Letters Patent.     Patented Aug. 21, 1917.

Application filed August 5, 1915. Serial No. 43,814.

*To all whom it may concern:*

Be it known that we, ARTHUR P. HAASE and FRANK D. PEARNE, citizens of the United States, and residents of Chicago, county of Cook, and State of Illinois, have invented certain new and useful Improvements in Systems of Rectification, of which the following is a specification, and which are illustrated in the accompanying drawings, forming a part thereof.

The invention relates to equipment for charging electric storage batteries and has for its object to provide an improved switch which shall be of simple construction and yet capable of controlling the charging current under any contingency which may arise.

In the accompanying drawings,—

Figure 1:
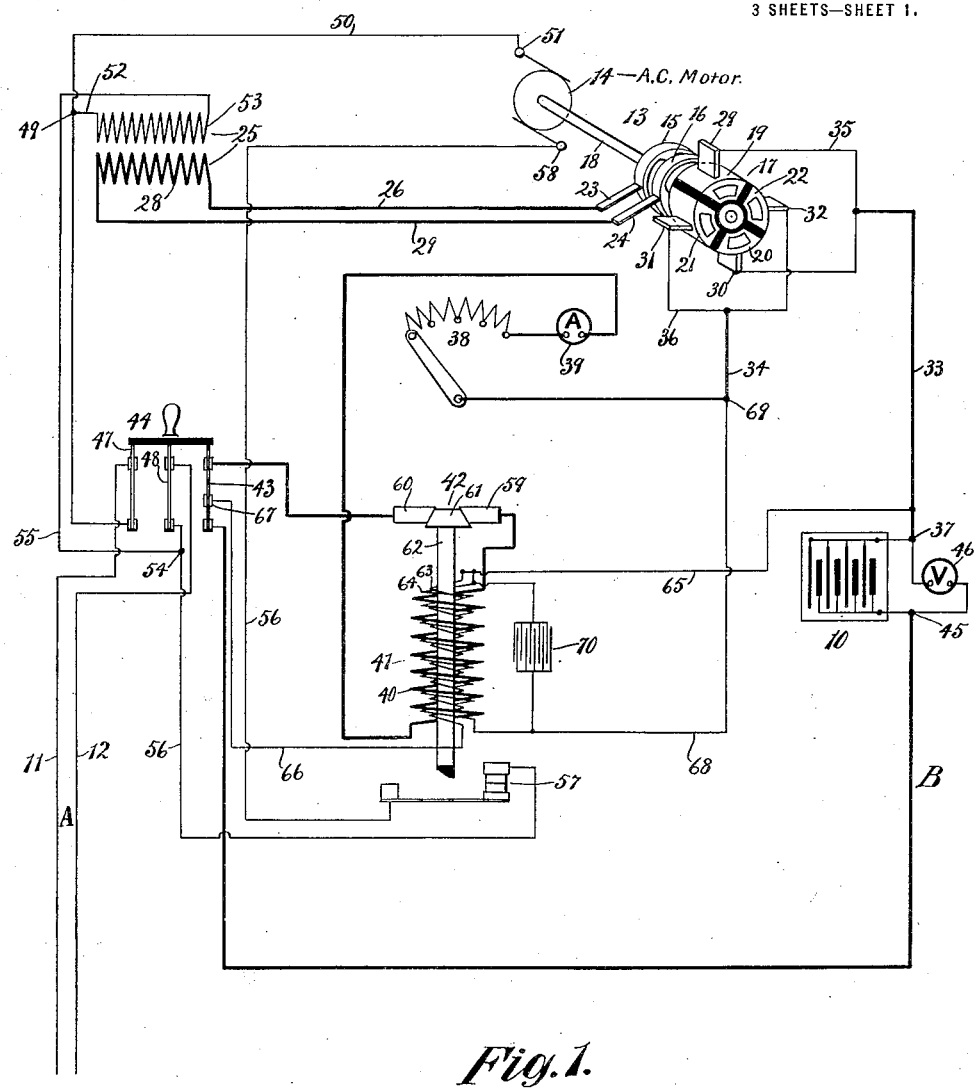
Figure 2:
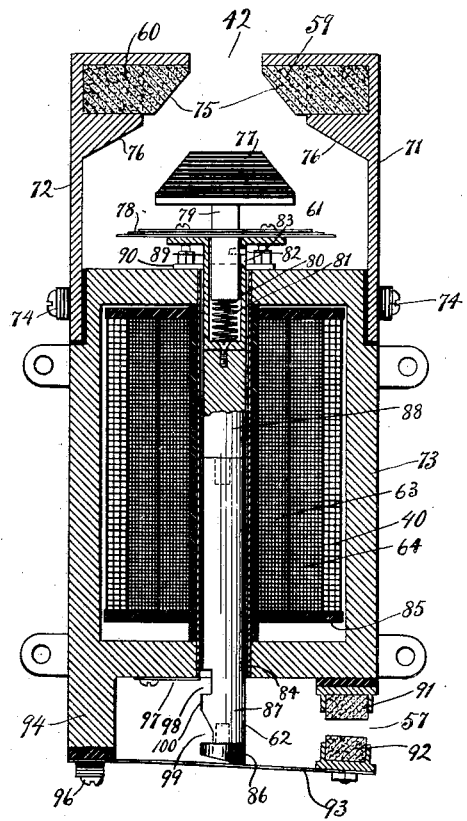
Figure 3:
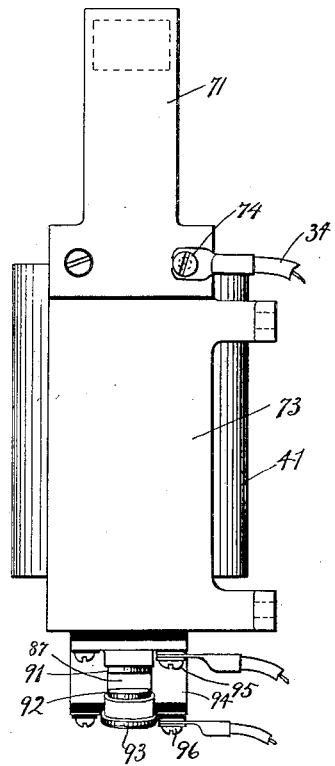
Figure 4:
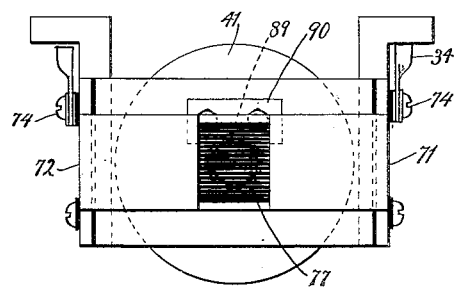
Figure 5:
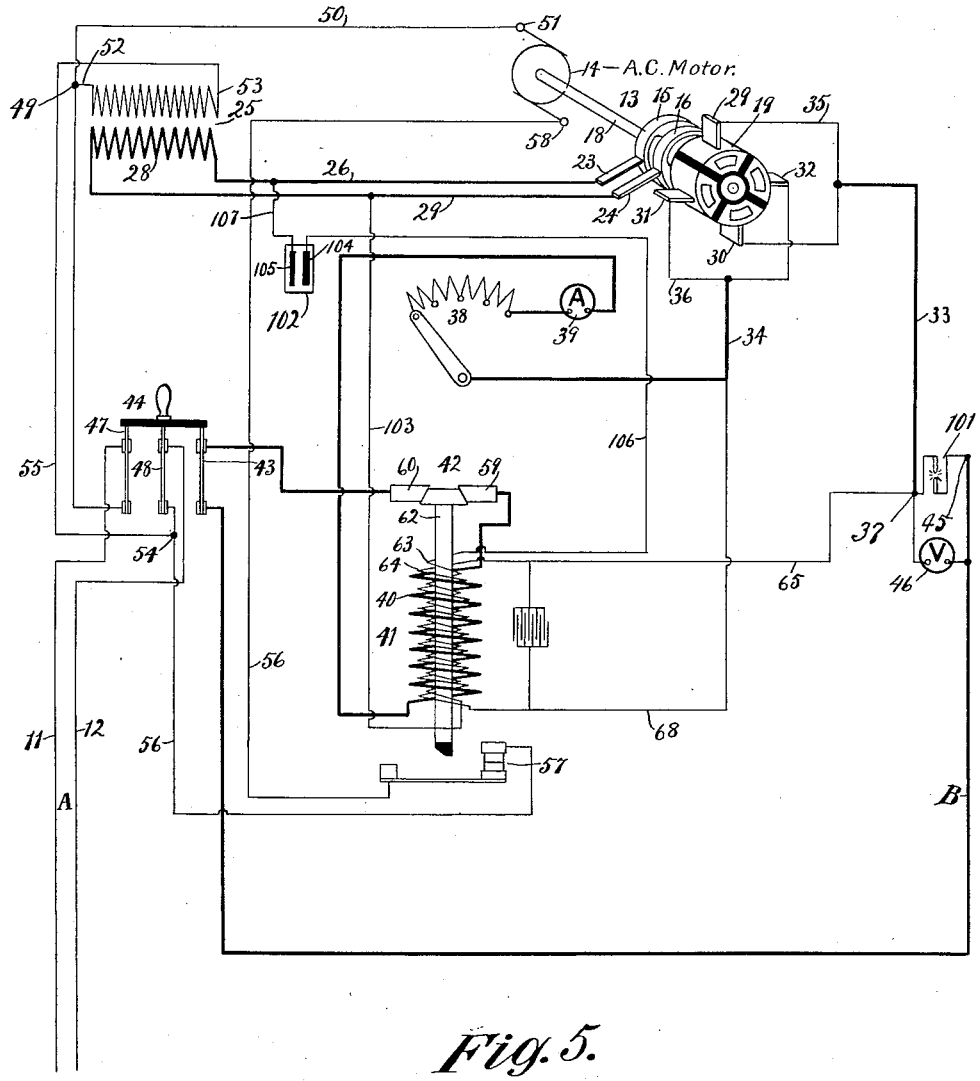

Figure 1 is a diagrammatic view showing one form of battery charging equipment with the appropriate type of switch provided by the invention for use in such equipment, Fig. 2 is a central vertical sectional view of the switch represented in Fig. 1, Figs. 3 and 4 show the same switch in side elevation and in plan, respectively, and Fig. 5 is similar to Fig. 1 but shows a modified arrangement of the apparatus which may be employed for supplying a rectified electric current to an arc lamp.

The particular form of switch illustrated in the drawings is more especially constructed to control the charging of a storage battery, as 10, when the source of electric energy is an alternating current supplied from a line circuit, as A. Under these circumstances some form of alternating current rectifier, as for example a commutator machine generally designated 13, is employed. The rectifier 13 may take the form of construction shown in the application of Arthur P. Haase, for alternating current rectifier, filed May 19th, 1914, Serial No. 825,724. This rectifier comprises a synchronous alternating current motor 14, a pair of continuous rings 15, 16, and a segmental commutator 17. In the simple arrangement shown, the rings 15, 16 and the segmental commutator 17 are all mounted upon the spindle, as 18, of the motor 14. The rings 15, 16, are insulated from each other and each ring is electrically connected with alternate sections, as 19, 20 and 21, 22 of the segmental commutator 17.

Alternating current from the line A is supplied to the motor 14 and to a pair of brushes, 23, 24, each of which is engaged with one of the rings 15, 16. If a transformer, as 25, is to be employed, the brushes 23, 24, are connected with the two leads, as 26, 27, from the secondary coil 28 of the transformer. When the commutator 17 has four segments, 19, 20, 21 and 22, as shown, and the speed of the motor 14 is such that the spindle 18 makes one revolution for each two cycles of the alternating current, four brushes, as 29, 30, 31 and 32 are preferably employed for receiving the commuted current. These brushes engage the commutator 17 and are arranged in pairs, the brushes 29, 30 and 31, 32 of each pair being connected with one of the parts, as 33 or 34 of the battery charging circuit B. For this purpose, bridging connections 35 and 36 are employed for connecting the alternate brushes.

In the arrangement shown one of the parts, as 33, of the battery charging circuit B extends directly from the bridging connection 35 to one of the battery charging terminals, as 37. The other part, as 34, of the battery charging circuit B extends from the bridging connection 36, through a rheostat 38, ammeter 39, one of the windings 40 of a solenoid 41, through an automatic switch generally designated 42, through one of the arms, as 43, of a knife switch 44, and thence to the other battery charging terminal, as 45. Preferably a volt meter 46 is connected between the battery charging terminals 37 and 45. As the improved switch provided by the invention is constructed to direct the flow of current to the terminals 37, 45, in accordance with the polarity of the battery, as 10, connected therewith, it will be understood that if the volt meter 46 is of a well known type adapted to indicate the voltage of current flowing in either direction, it will be immaterial which poles of the battery, as 10, are connected with the respective terminals 37, 45.

The knife switch 44 preferably also includes blades 47 and 48 for controlling the two sides 11, 12, of the line circuit A. The part 11 of the line circuit A is controlled by the blade 47. Beyond this switch, the line 11, branches at 49, one of its branches as 50, going to one of the terminals 51 of the motor 14, and the other branch, as 52, extending to the primary coil 53 of the transformer 25. The part 12 of the line circuit A is controlled by the blade 48 of the switch 44. Beyond this switch it branches, as at 54, one of its branches, as 55, going to the primary coil 53 of the transformer 25 and the other branch, as 56, extending through a switch 57 and thence to the terminal 58 of the motor 14. The switch 57 accordingly serves to control the motor 14 when the switch 44 is closed. In the preferred arrangement shown, the switch 57 is automatically controlled.

The switch 42 may comprise a pair of stationary terminals 59, 60, and a movable bridge piece 61. The bridge piece 61 is shown as being mounted upon one end of a plunger 62 and this plunger constitutes the core of the solenoid 41.

In addition to the winding 40, the solenoid may also have two other windings 63 and 64. Both of these last mentioned windings are shown as being connected at one end with the part 33 of the battery charging circuit B, as by a common lead 65. At their other ends both of the windings 63 and 64 are connected to the part 34 of the battery charging circuit B but at opposite sides of the automatic switch 42. As shown, a lead 66 extends from the lower end of the winding 63 to a supplemental contact 67 of the switch blade 43. Similarly a lead 68 extends from the lower end of the winding 64 to a point of connection 69 with the part 34 of the battery charging circuit B near the corresponding brushes, as 31, 32, of the rectifier 13. The winding 64 is preferably equipped with some device, as a condenser, 70, for reducing inductive resistance.

We prefer to construct the switches 42 and 57 in the manner illustrated in detail in Figs. 2, 3 and 4. As there shown, the two fixed contacts 59, 60 of the switch 42 are carried by arms 71 and 72 which rise from a rectangular frame 73 at opposite sides of the same. The arms 71, 72, are insulated from the frame 73 and each arm is provided with a binding screw 74 for making the appropriate connections by which the switch 42 is interposed in the part 34 of the battery charging circuit B. Preferably each arm 71, 72, is equipped with a beveled carbon contact element 75 and a beveled metallic contact element 76. When so constructed the bridge piece 61 comprises a pair of relatively movable contact elements 77 and 78. The contact element 77 desirably takes the form of a carbon block and has a metallic stem 79. This stem is slidingly mounted in a tubular socket 80 which is provided in the higher end of the plunger 62. A spring 81 reacts between the lower end of the stem 79 and the bottom of the socket 80 for elevating the contact element 77 and a pin 82 is fixed in the stem 79 and moves in a slotted opening 83 in the wall of the socket 80 to limit relative movement between the contact elements 77 and 78. The contact element 78 is preferably composed of elastic metal strips. These are fixedly secured against the higher end of the plunger 62 and project at opposite sides of the same for engagement with the metallic contact elements 76 of the terminals 59 and 60.

The plunger 62 slides within a brass tube 84 and this tube extends centrally through the frame 73 from top to bottom. The several windings, as 40, 63 and 64 of the solenoid 41 are all mounted upon a spool 85 which fits within the frame 73 and surrounds the tube 84. In order that the plunger 62 may not reach a neutral position with reference to the windings 40, 63 and 64, it is preferably constructed of iron for a portion of its length only. As shown, the plunger 62 comprises an insulated tip 86, a soft iron portion 87 which extends upwardly from the tip 86 throughout somewhat more than half the total length of the plunger, a round brass section 88 and a tubular brass section 89 of angular cross section. The sections 87, 88 and 89 are connected end to end and the bore of the section 89 provides the socket 80 for receiving the stem 79 of the contact element 77. The section 89 is made of angular cross section to provide a convenient means for preventing rotation of the plunger and consequent angular displacement of the bridge piece 61 with reference to the terminals 59 and 60. As shown, a guide plate 90 is secured against the top of the frame 73 for sliding engagement with one of the flat sides of the part 89.

The switch 57 comprises fixed and movable contact elements 91, 92. When this switch is to be automatically controlled, as shown, the fixed contact element 91 is conveniently secured against, but insulated from, the under side of the frame 73, near one side. The movable contact element 92 is mounted upon one end of a leaf spring 93. This spring extends transversely beneath the frame 73 in the path of the lower end of the plunger 62. When not engaged by the plunger, it serves to lift the contact element 92 into engagement with the contact element 91. The switch 57 is accordingly closed whenever the plunger 62 is raised. The other end of the leaf spring 93 is secured against any convenient insulated support, as for example, a stud or post 94, which depends from the frame 73 at one of its corners. Binding screws 95 and 96 serve for making the appropriate connections for interposing the switch 57 in that part, as 56, of the line circuit A, which leads to the motor 14.

As the arrangement contemplates that the plunger 62 is at first to be raised only through a sufficient distance to permit the closing of the switch 57 and is to occupy an intermediate position for a time before being elevated to close the switch 42, a cushioning device is desirably employed to prevent the plunger being moved beyond the intermediate position by an impulse which is not intended to effect its complete movement. While this cushioning device may take any convenient form, we prefer to accomplish the desired cushioning by magnetic action upon the plunger 62. As shown, a plate 97 of magnetic material is secured against the under side of the frame 73 in a position to project under the lower end of the brass tube 84 at one side of the plunger. If now, the plunger 62 is provided with lateral notches 98 and 99, separated by an intermediate elevated portion 100, magnetic attraction between the plate 97 and the plunger will have substantially no effect in resisting the movement of the plunger, when it is near either of its extreme positions, but will retard its movement as the plunger approaches the intermediate position.

The operation of the apparatus is as follows:—Upon closing the switch 44, the switch blade 43 serves to close the circuit from the battery 10 through the winding 63 of the solenoid 41. The residual battery current accordingly serves to lift the plunger 62 but only to an intermediate position. This allows the motor switch 57 to close, the switch 42 remaining open. If the switch 44 is provided with the supplemental contact 67, the closing of the motor switch 57 occurs before the closing of the switch 44 is completed, and sparking is reduced. When the switch 44 is completely closed, the line circuit A is closed by the switch blades 47, 48 and current is supplied to the motor 14 and to the brushes 23, 24 of the rectifier. The battery charging circuit B is also closed by the switch blade 43 but is still open at the switch 42.

When the motor 14 attains normal speed, the commuted current flows through the winding 64 of the solenoid 41, being supplied thereto from the brushes 29, 30, 31 and 32, bridging connections 35, 36 and lines 65 and 68. If the commuted current is taken by the brushes 29, 30, 31 and 32 in the proper direction to charge the battery 10, the lifting action of the winding 64 of the solenoid 41 will supplement the lifting action of the residual battery current in the winding 63 and raise the plunger 62 to close the switch 42. The commuted current now flows to the battery and serves to energize the winding 40 of the solenoid 41. All three of the windings 40, 63 and 64 coöperate to support the plunger 62 in elevated position and this condition continues so long as there is no interruption of the current supplied from the line either by opening the switch 42 or otherwise. Loss of energy in the solenoid 41 is avoided by making the windings 63 and 64 of high resistance and the winding 40 of very low resistance.

Should the current in the line circuit A fail at any time, battery current will momentarily be supplied to all of the windings of the solenoid 41. That supplied to the windings 63 and 64 will be in the same direction as when the commuted current is being supplied to the battery but the current flowing through the coil 64 will return through the main line, including the coil 40, which it follows, however, in the reverse direction. The latter coil will so far neutralize the others that the solenoid core will drop sufficiently to open the switch 42, leaving only the coil 63 closed. The switch 57 will remain closed, and the apparatus will accordingly resume the charging of the battery automatically whenever current is again supplied in the line circuit A.

If the rectified current flows in the wrong direction for charging the battery, either upon the starting of the apparatus or because of any momentary interruption of the line current, it will oppose the battery current in the coils 63 and 64, rendering them inert. The coil 40, because of its small number of turns, not being of sufficient strength to support the solenoid core, the switches 42 and 57 will both be opened. Thereupon the flow of current from the battery through the coil 63 will be immediately resumed and the core will be raised to its intermediate position, permitting the switch 57 to close. The motor having been momentarily checked by the opening of the switch 57, will be restored to its normal speed and the operation of the apparatus resumed. This action will be repeated, if necessary, until the rectified current flows in the proper direction. Inasmuch as the commuted current is a pulsating or interrupted current, the use of the condenser 70, or an equivalent contrivance, is important to permit the lifting effect of the winding 63 being neutralized by the winding 64, without making the winding 64 unduly large. It is found that by interposing the condenser 70 between the terminals of the windings 64, the windings 63 and 64 may be made of like resistance and a like number of ampere turns although when the winding 64 is built about the winding 63, as shown, it will be composed of a greater length of larger wire.

When the battery, as 10, cannot be relied upon to supply current to the coil 63 for the initial raising of the plunger 62, or when the commuted current is to be supplied to some other form of energy converter, as for example, an arc light 101 (Fig. 5) the winding 63 is preferably supplied with current from the line circuit A through some form of rectifier, as for example, the cell 102 having lead and aluminum plates 104, 105. For this purpose a lead 103 serves for connecting one end of the winding 63 directly with one end of the secondary 28 of the transformer 25. The other end of the winding 63 is connected with one of the plates, as 104, of the cell 102, by a wire 106. A wire 107 connects the other plate, as 105, of the cell 102 with the other end of the secondary 28 of the transformer 25.

When the cell 102 is employed, a small volume of rectified current is supplied to the winding 63 of the solenoid 41 whenever the switch 44 is closed. This serves to lift the plunger 62 to its intermediate position and allows the closing of the motor switch 57. The operation of the apparatus is otherwise exactly the same as when the winding 63 is supplied with current from a battery, as 10, (Fig. 1), except that upon failure of current in the line circuit A, for any reason, the plunger 62 falls by reason of a failure of current in all of the windings 40, 63 and 64. It then remains in its lowermost position and holds the motor switch 57 open until the flow of current in the line circuit A is again resumed. It will be understood that the cell 102 serves as a polarity selector and determines the direction of the current supplied to the arc lamp 101. It will be understood that with either form of apparatus shown, a change of phase in the line circuit A, resulting in a reversal in the direction of the commuted current, will cause a temporary opening of the switch 42, and a temporary checking of the motor 14 by the opening of the switch 57 until the commuted current takes the proper direction, after which the switch 42 will again be closed automatically.

We claim as our invention—

1. In combination, a line circuit, a work circuit, a motor-driven rectifier interposed between the line circuit and the work circuit, a switch controlling the motor, electro-magnetic means of predetermined polarity for closing the switch, and electro-magnetic means supplied with current from the rectifier operating to open the switch when the rectified current is in a given direction determined by the polarity of the first-mentioned electro-magnetic means.

2. In a battery-charging apparatus, in combination, a rectifier constructed to supply direct current in either direction, a secondary battery in the direct current circuit of the rectifier, and means including the battery for maintaining the flow of the rectified current in a given direction.

3. In combination, a work circuit, a rectifier constructed to supply direct current to the work circuit in either direction, a switch in the work circuit, and automatic means controlling the switch and the rectifier and operating to close the switch only when current is supplied by the rectifier in a given direction and to open the switch when the current flows in the opposite direction.

4. In a system of rectification, in combination, a rotary rectifier, a secondary battery in the direct current circuit of the rectifier, and means controlled in part by the battery for controlling the direction of current flow from the rectifier.

5. In a system of rectification, in combination, a rotary rectifier, a synchronizing motor for driving the rectifier, a cut-out switch in the motor circuit, and electro-magnetic means responsive to the direction of flow of the rectified current for controlling the switch.

6. In a system of rectification, in combination, a rotary rectifier, a secondary battery in the direct circuit thereof, a motor for driving the rectifier, a normally open switch in the motor circuit, and electro-magnetic means for effecting the closing of the switch when the direct current flows to the positive terminal of the battery.

7. In a system of rectification, in combination, a rotary rectifier, a secondary battery in the direct circuit of the rectifier, and electro-magnetic means controlled in part by the battery for insuring the flow of current from the rectifier to the positive terminal of the battery.

8. In a system of rectification, in combination, a rotary rectifier, a synchronizing motor for driving the rectifier, a secondary battery in the direct current circuit, a normally open cut-out switch in the motor circuit, electro-magnetic means controlled in part by current from the battery for effecting the closing of the switch, and a shunt line from the direct current circuit for counteracting the action of the battery on the electro-magnetic means when the direct current flows to the negative pole of the battery.

9. In a system of rectification, in combination, a rotary rectifier, a synchronizing motor for driving the rectifier, and means controlled by the direct current circuit for opening and closing the circuit of the motor, such circuit-controlling means being responsive to the direction of flow of current in the direct current circuit.

10. In a system of rectification, in combination, an electric circuit for an alternating current, a rotary rectifier in the circuit, a synchronizing motor supplied with current from the circuit and arranged to drive the rectifier, a cut-out switch in the motor circuit, and electro-magnetic means supplied with rectified current from the circuit and operating to effect the opening and closing of the switch according to the direction of flow of the current supplied therethrough.

11. In a system of rectification, in combination, an electric circuit, a rotary rectifier in the circuit, means for driving the rectifier in synchronism with the alternating current impulses, and electro-magnetic means responsive to the direction of flow of the rectified current for controlling the driving means.

12. In a system of rectification, in combination, an electric circuit supplied with alternating current, a rotary rectifier in the circuit, a synchronizing motor for driving the rectifier, a normally open cut-out switch in the motor circuit, electro-magnetic means for controlling the switch and comprising a coil supplied with direct current flowing in one direction only and a coil connected with the terminals of the rectifier and adapted to supplement or oppose the first-named coil according to the direction of current flow from the rectifier.

13. In a battery-charging apparatus, in combination, a rectifier constructed to deliver direct current in either direction, a secondary battery in the direct current circuit of the rectifier, and means dependent upon the battery for maintaining the flow of the rectified current in a given direction.

14. In combination, a line circuit, a work circuit, a motor-driven rectifier interposed between the line circuit and the work circuit, said rectifier being operable to supply direct current in either direction, a solenoid having three windings, one of said windings being operable alone to move the solenoid core only to an intermediate position, another of said windings being supplied with direct current from the rectifier and the remaining winding being in the work circuit, a switch controlling the motor of the rectifier, said switch being opened by the core of the solenoid when no current is supplied to any of the solenoid windings and being closed by the movement of the solenoid core to the said intermediate position, means for supplying current to the first-described solenoid winding in a given direction, and a switch in the work circuit closed upon movement of the solenoid core by the coöperative action of the two first-described solenoid windings when both of said windings are supplied with current in the same direction.

ARTHUR P. HAASE.
FRANK D. PEARNE.